United States Patent
Zimmitti et al.

(10) Patent No.: US 11,525,515 B2
(45) Date of Patent: Dec. 13, 2022

(54) RADIAL SEAL SEGMENT JOINT

(71) Applicant: United Technologies Corporation, Farmington, CT (US)

(72) Inventors: Jonathan F. Zimmitti, Glastonbury, CT (US); Nasr A. Shuaib, Watertown, MA (US); Jonathan Logan Miller, Belchertown, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 365 days.

(21) Appl. No.: 16/788,126

(22) Filed: Feb. 11, 2020

(65) Prior Publication Data

US 2021/0246987 A1 Aug. 12, 2021

(51) Int. Cl.
- F16J 15/28 (2006.01)
- F16J 15/44 (2006.01)
- F16J 15/30 (2006.01)

(52) U.S. Cl.
CPC ............. F16J 15/442 (2013.01); F16J 15/28 (2013.01); F16J 15/30 (2013.01)

(58) Field of Classification Search
CPC ............. F16J 15/442; F16J 15/28; F16J 15/30
See application file for complete search history.

(56) References Cited

U.S. PATENT DOCUMENTS

| | | | | |
|---|---|---|---|---|
| 1,292,101 A | * | 1/1919 | Shaw | F16J 9/14 |
| | | | | 277/499 |
| 2,768,036 A | * | 10/1956 | Greenough | F16J 15/3272 |
| | | | | 277/448 |
| 5,169,159 A | * | 12/1992 | Pope | F16J 15/441 |
| | | | | 277/422 |
| 8,205,891 B2 | | 6/2012 | Vasagar | |
| 8,540,250 B2 | * | 9/2013 | Sato | F16J 15/067 |
| | | | | 277/371 |
| 9,004,495 B2 | | 4/2015 | Vasagar | |
| 9,638,326 B2 | | 5/2017 | Haynes | |
| 9,695,940 B2 | | 7/2017 | Haynes et al. | |
| 2012/0261887 A1 | | 10/2012 | Vasagar | |
| 2016/0169389 A1 | | 6/2016 | Haynes | |
| 2019/0323370 A1 | * | 10/2019 | Trivedi | F01D 11/003 |

FOREIGN PATENT DOCUMENTS

| | | | |
|---|---|---|---|
| BE | 336699 A | 9/1926 | |
| CN | 1040354 C * | 10/1998 | ............ F16J 9/14 |
| DE | 3806348 A1 * | 9/1989 | ............ F16J 9/14 |

OTHER PUBLICATIONS

Extended European Search Report dated Jul. 7, 2021, received for corresponding European Application No. 21155956.2, 7 pages.

* cited by examiner

*Primary Examiner* — Vishal A Patel
(74) *Attorney, Agent, or Firm* — Kinney & Lange, P.A.

(57) ABSTRACT

Apparatus and associated methods relate to a segmented radial seal assembly that includes at least two segments, each segment having a first end and a second end at opposite ends. A first segment first end has a protruding feature and defines a tangential vector from a circumferential ring that is formed by the segmented radial seal. The protruding feature defines a curved face having at least a first axis of curvature that is parallel to the tangential vector. The second segment second end has a recessed feature that is matingly engageable to the first segment first end, thereby forming a first radial seal segment joint. The segmented radial seal assembly is configured to surround a shaft.

14 Claims, 7 Drawing Sheets

RADIAL SEAL SEGMENT JOINT

BACKGROUND

The present disclosure relates to shaft seals, and more particularly, to a joint between adjacent radial seal segments that form a segmented radial seal.

A radial seal can provide a seal around a rotating shaft to provide an isolation between a higher-pressure fluid and a lower-pressure fluid. Segmented radial seals are used to form a seal between a rotating shaft and a stationary housing or other structure that surrounds the rotating shaft in order to minimize leakage of a working fluid past the seal. Several arc-shaped segments are typically used to construct the seal. The use of multiple seal segments facilitates the placement of the radial seal around the shaft during a manufacturing process, while also accommodating shaft imperfections, thermal expansion, and other variations that can exist during operation. The radial seal segments couple with each other at a segment joint (i.e., interface) between adjacent segments, and are held in place with suitable retaining devices. A gas turbine engine can include several segmented radial shaft seals, each configured to minimize the leakage of air and/or oil from a high-pressure side to a low-pressure side of the respective radial shaft seal.

A disadvantage of using multiple segments in a radial seal, as compared to an unsegmented or unitary seal design, is that the working fluid can leak through the joint between each of the various segments. Radial seal segments having square or triangular interface geometries interface (i.e., joint geometries) are known in the art. A disadvantage of a square or triangular interface between adjacent contacting radial seal segments is that fluid leakage can occur past the seal segment interface, particularly when there is a misalignment and/or relative motion between adjacent seal segments. When used on a gas turbine engine, for example, excessive radial seal segment joint leakage can reduce the operating efficiency of the gas turbine engine, and can also lead to excessive wear, which can result in increased maintenance requirements. Accordingly, there is a need for a radial seal segment joint that reduces joint leakage while accommodating variations in a shaft that it surrounds.

SUMMARY

The present disclosure generally relates to a segmented radial seal assembly that includes a first and a second segment, each having a first end and a second end at opposite ends. A first segment first end has a protruding feature and defines a tangential vector from a circumferential ring that is formed by the segmented radial seal. The protruding feature defines a curved face having at least a first axis of curvature that is parallel to the tangential vector. The second segment second end has a recessed feature that is matingly engageable to the first segment first end, thereby forming a first radial seal segment joint. The segmented radial seal assembly is configured to surround a shaft.

The present disclosure also generally relates to a segmented radial seal that includes two or more radial seal segments, each having a first end and a second end. The first end includes a protruding feature and defines a tangential vector from a circumferential ring that is formed by the segmented radial seal. The protruding feature defines a curved face having at least a first axis of curvature that is parallel to the tangential vector. The second end includes a recessed feature that is matingly engageable to the first end.

DETAILED DESCRIPTION

The present disclosure is directed to a joint that is formed by two adjacent segments of a contacting radial seal. The joint can be referred to as an interface between two adjacent segments. A radial seal can include two or more segments that together encircle the shaft. This can be referred to as a segmented radial seal. For example, six radial seal segments can be used, with each having a radial arc of about 60 degrees. A segmented radial seal can be either "arch-bound" or "contacting", wherein the latter makes contact or near-contact with the radial surface of the shaft, perhaps floating over the surface of a rotating shaft on a thin layer of fluid. A benefit in using a contacting segmented radial seal is that the various segments can move relative to each other, thereby accommodating variations (i.e., imperfections) in the surface profile of the shaft. Shaft runout from thermal bowing is an example of an imperfection that can be accommodated by a contacting segmented radial seal.

A gas turbine engine is a non-limiting example of where a contacting segmented radial seal can be used, however the scope of the present disclosure includes all known or possible uses of contacting segmented radial seals. A modern gas turbine engine can include a number of contacting segmented radial seals, each configured to provide an isolation between a higher-pressure fluid and a lower-pressure fluid. The higher-pressure fluid can be referred to as a first fluid, and the lower-pressure fluid can be referred to as a second fluid. The first and/or second fluids can be liquid and/or gas, or a mixture of liquid and gas. Oil and fuel are exemplary liquids, and air is an exemplary gas. In some embodiments, the gas can be a rarefied gas (e.g., near-vacuum) or a vacuum.

Figure 1B:
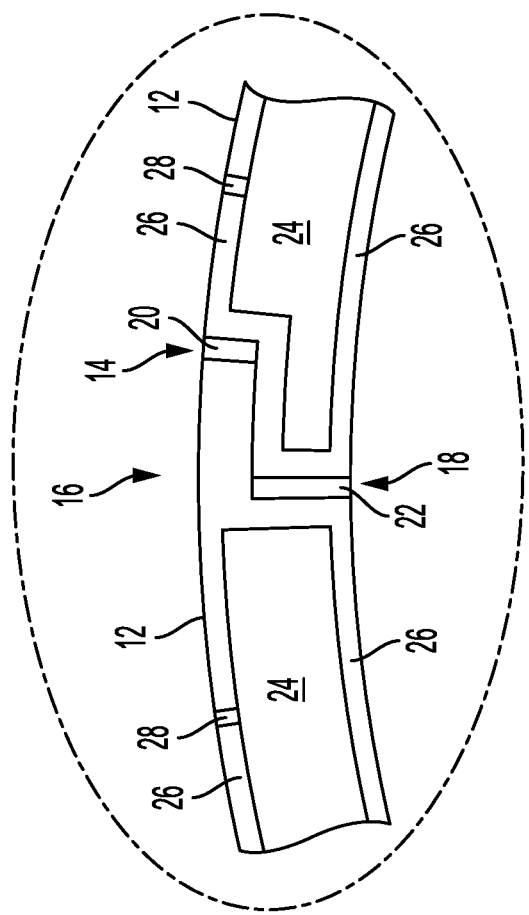
FIG. 1B is a radial side view showing an interface between two adjacent radial seal segments shown in FIG. 1A.
Figure 1A:
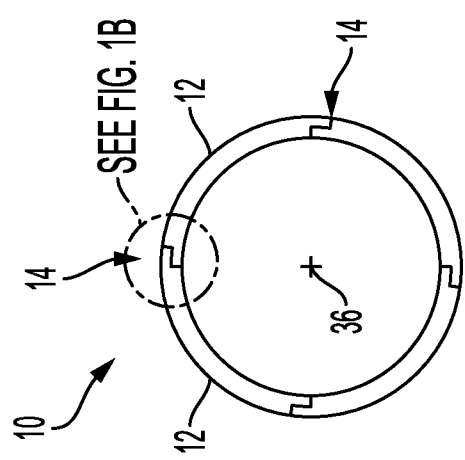
FIG. 1A is a schematic radial side view showing a segmented radial seal.
Figure 1C:
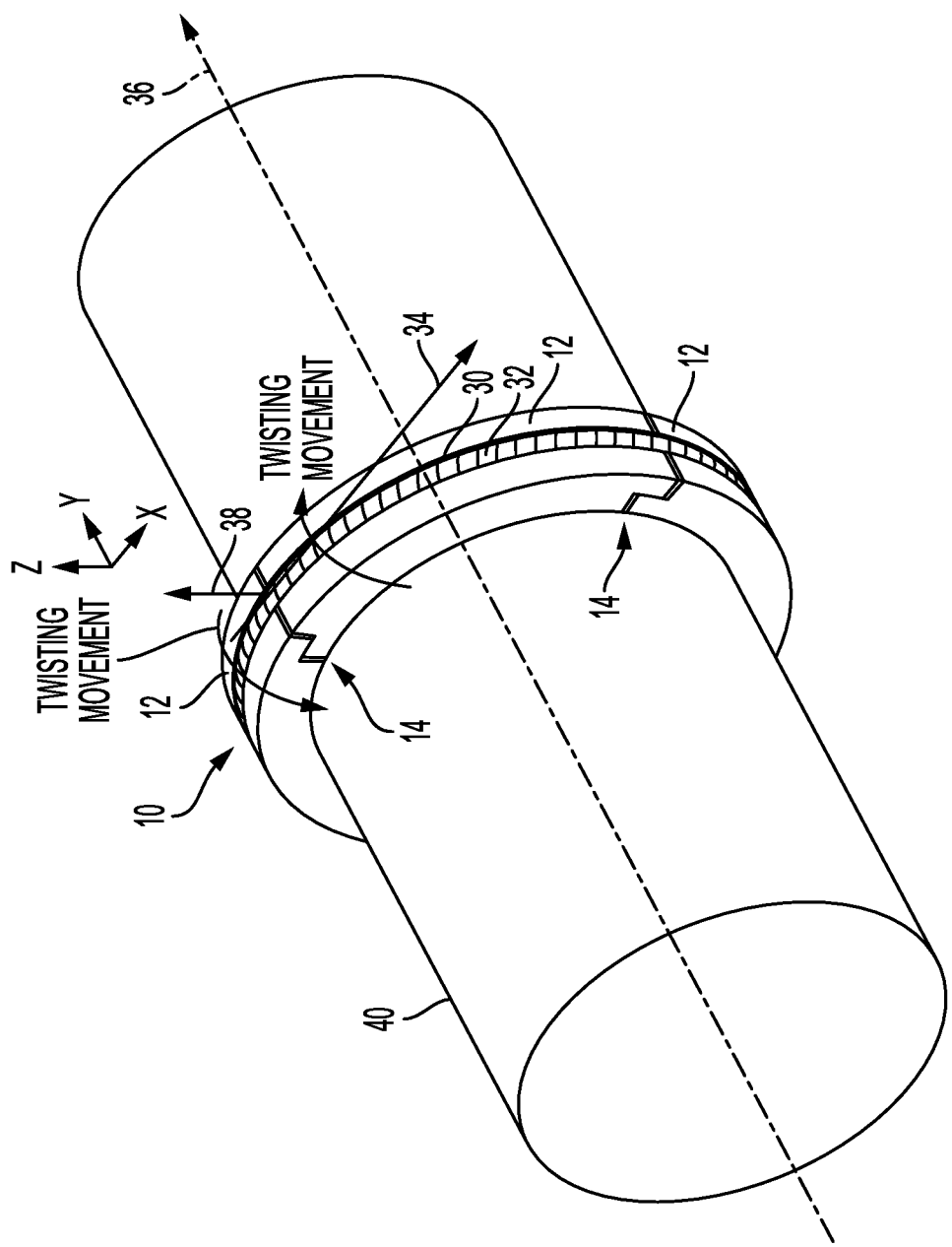
FIG. 1C is a schematic perspective view of the segmented radial seal of FIG. 1A on a shaft.

FIGS. 1A-1C will be discussed concurrently. FIG. 1A is a schematic radial side view showing a segmented radial seal of the present disclosure. FIG. 1B is a radial side view showing an interface between two adjacent radial seal segments shown in FIG. 1A. FIG. 1C is a schematic perspective view of the segmented radial seal of FIG. 1A on a shaft, schematically showing the segmented radial seal devoid of any other axial components. Shown in FIGS. 1A-1C are segmented radial seal 10, segments 12, segment interfaces 14, outer surface 16, radial contact face 18, high pressure gap 20, low pressure gap 22, axial face recesses 24, axial contact surfaces 26, axial contact surface gaps 28, circumferential groove 30, circumferential spring 32, circumferential tangent vector 34, shaft axis 36, radial vector 38, and shaft 40. In the illustrated embodiment, four segments 12 together form segmented radial seal 10, each segment 12 having a radial arc of about 90 degrees. Any two adjacent segments 12 form segment interface 14. Outer surface 16 is the radial outward-facing surface of segmented radial seal 10, and radial contact face 18 is the radial inward-facing surface of segmented radial seal 10. Segmented radial seal 10 can also be referred to as a segmented radial seal assembly. During operation (i.e., when shaft 40 rotates), radial contact face 18 makes contact with the radial surface of shaft 40. Shaft 40 can also be referred to as a runner. In some embodiments, radial contact face 18 of each segment 12 can float over shaft 40 (i.e., runner) on a fluid film, thereby making near contact with shaft 40. In these embodiments, segmented radial seal 10 is still referred to as a contacting radial seal. In the illustrated embodiment, outer surface 16 can be exposed to a higher-pressure fluid (i.e., a first fluid), and radial contact face 18 can be exposed to a lower-pressure fluid (i.e., a second fluid). Each segment interface 14 includes high pressure gap 20 and low pressure gap 22, together providing for a circumferential expansion and/or contraction of segments 12, thereby assuring that segments 12 maintain contact or near contact with shaft 40. Thermal expansion or contraction of segments 12 can cause the physical dimension of segments 12 (i.e., segmented radial seal 10) to change relative to the physical dimension of shaft 40, thereby allowing high and low pressure gaps 20, 22 to accommodate these changes. In an exemplary embodiment, segments 12 can be made of carbon or a material made of carbon (e.g., graphite), which can have a coefficient of thermal expansion that is different from that of shaft 40. Moreover, carbon can be used to make segments 12 because carbon is a relatively soft material, which can result in wear (i.e., loss of material over time). As wear occurs over the life of segments 12 (i.e., segmented radial seal 10), the loss of material is accommodated by the narrowing of high and low pressure gaps 20, 22. Generally speaking, high and low pressure gaps 20, 22 will exist on at least one segment interface 14 of segmented radial seal 10 during normal operation for the proper operation of segmented radial seal 10 to occur. However, high and low pressure gaps 20, 22 can be included on all radial segment interfaces 14 of segmented radial seal 10 during normal operation. Without any high and/or low pressure gaps 20, 22, segmented radial seal 10 can become "arch-bound", which is deemed to be a failure mode of a contacting radial seal. Arch-bound radial seals are known in the art as being directed to a different mechanism of sealing than a contacting radial seal.

Referring now to FIG. 1B, which depicts an axial view of two adjacent segments 12 showing axial face recesses 24 and axial contact surfaces 26. In the illustrated embodiment, axial contact surface gaps 28 allow for a higher-pressure fluid to pressurize axial face recesses 24, which can help create a fluid film between segmented radial seal 10 and shaft 40. Radial contact face 18 can include radial face recesses and radial contact surfaces (not shown).

Referring again to FIGS. 1A-1C, when segmented radial seal 10 is assembled around shaft 40, segments 12 are held in position by circumferential spring 32 which lies in circumferential groove 30 that circumferentially surrounds outer surface 16. Circumferential spring 32 can also be referred to as a garter spring. The spatial orientation of any particular segment interface 14 can be described in terms of an x-y-z orthogonal (i.e., Cartesian) coordinate system, as shown in FIG. 1C. Circumferential tangent vector 34 is tangent to segment interface 14 in a circumferential direction (i.e., as defined by circumferential groove 30). Circumferential tangent vector 34 is parallel to the x-axis for the respective segment interface 14. Shaft axis 36 defines the centerline of shaft 40, and is parallel to the y-axis for the respective segment interface 14. Radial vector 38 extends radially outward from segmented radial seal 10, and is parallel to the z-axis for the respective segment interface 14. As shaft 40 rotates (e.g., during the operation of a gas turbine engine that includes segmented radial seal 10), shaft runout and/or other imperfections can cause one or more segment interfaces 14 to move in a direction of one or more of circumferential tangent vector 34, shaft axis 36, and/or radial vector 38 (i.e., in the x-, y-, and/or z-axes). Moreover, shaft runout and/or other causes of anti-parallelism of a surface of shaft 40 with respect to shaft axis 36 can cause adjacent segments 12 to twist with respect to each other, as shown in FIG. 1C. Twisting movement can be described as a slight rotation of adjacent segments 12, with respect to each other, about a rotation axis defined by circumferential tangent vector 34. Segment interface 14 (i.e., the radial seal segment joint) of the present disclosure can accommodate the twisting of adjacent segments 12 with respect to each other.

Figure 2A:
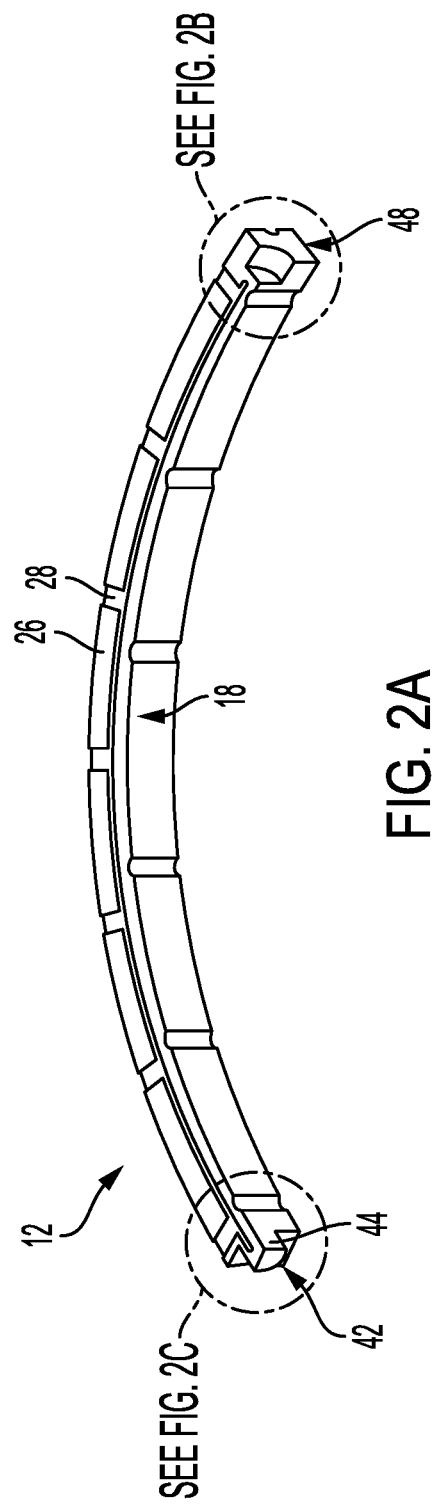
FIG. 2A is a perspective view of a radial seal segment with curved segment interface geometry at each segment end.
Figure 2C:
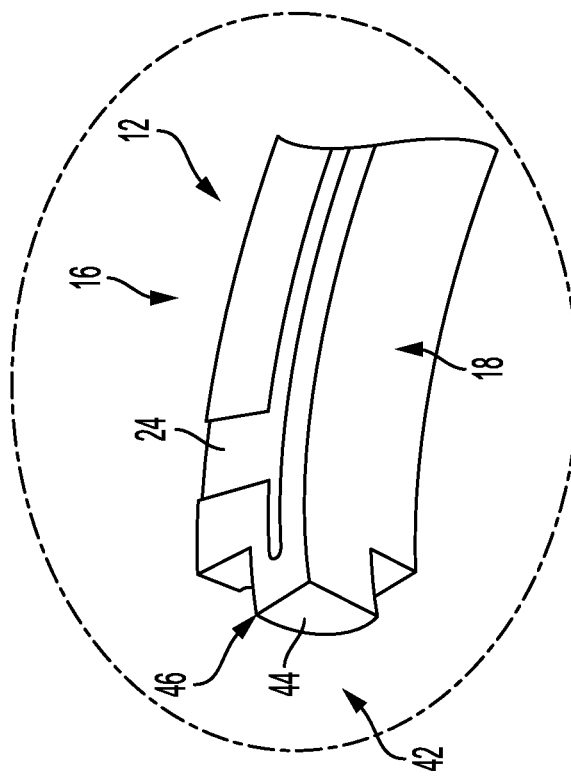
FIG. 2C is an enlarged view showing a protruding end of the radial seal segment shown in FIG. 2A.
Figure 2B:
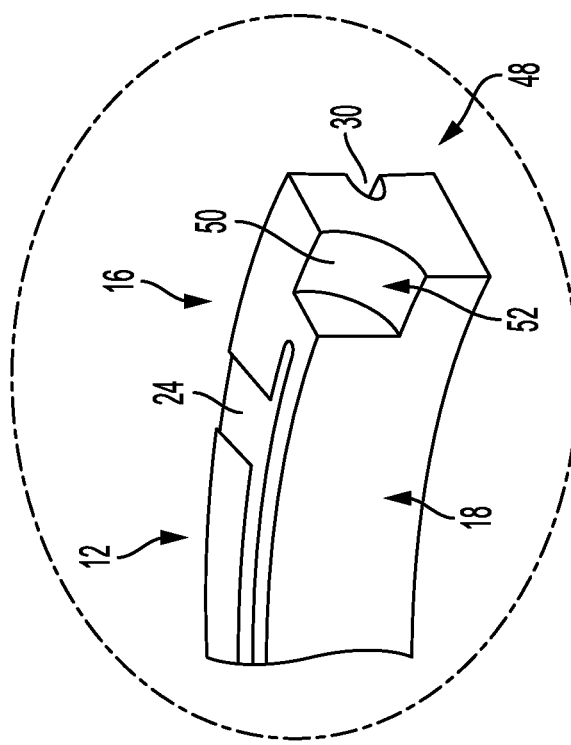
FIG. 2B is an enlarged view showing a recessed end of the radial seal segment shown in FIG. 2A.

FIGS. 2A-2C will be discussed concurrently. FIG. 2A is a perspective view of segment 12 (i.e., radial seal segment) with curved segment interface geometry at each segment end. FIG. 2B is an enlarged view showing a recessed end of segment 12 shown in FIG. 2A. FIG. 2C is an enlarged view showing a protruding end of segment 12 shown in FIG. 2A. Shown in FIGS. 2A-2C are segment 12, outer surface 16, radial contact face 18, axial face recesses 24, axial contact surfaces 26, axial contact surface gaps 28, circumferential groove 30, first end 42, protruding feature 44, protruding feature curved surface 46, second end 48, recessed feature 50, and recessed feature curved surface 52. The descriptions of segment 12, outer surface 16, radial contact face 18, axial face recesses 24, axial contact surfaces 26, axial contact surface gaps 28, and circumferential groove 30 are substantially as provided above in regard to FIGS. 1A-1C. Differences in the relative sizes, shapes, and layout configuration of axial face recesses 24, axial contact surfaces 26, and axial contact surface gaps 28 can vary in different embodiments. Each segment 12 has a first end 42 and a second end 48.

In the illustrated embodiment, first end 42 includes protruding feature 44 having protruding feature curved surface 46, and second end 48 includes recessed feature 50 having recessed feature curved surface 52. The profile of recessed feature curved surface 52 accommodates the profile of protruding feature curved surface 46 such that protruding feature 44 is configured to matably interface with recessed feature 50. Mated together, first end 42 and second end 48 form segment interface 14, as shown and described above in regard to FIGS. 1A-1C. Moreover, the curvature of recessed feature curved surface 52 and the curvature of curved surface 46 allows twisting of adjacent segments 12 with respect to each other, as described above in regard to FIG. 1C. First end 42 having protruding feature 44 can be referred to as a male end, and second end 48 having recessed feature 50 can be referred to as a female end. Accordingly, each segment interface 14 of a particular segmented radial seal 10 includes a male end and a female end, matingly connected, with each segment having a male end at first end 42 and a female end at second end 48. When so mated, two adjacent segments 12 can be referred to as a first segment and a second segment. An advantage of segment 12 having male and female ends at opposite ends (i.e., as shown in FIG. 2A) is uniformity of segment design in a particular segmented radial seal 10, and the ability to use either an even number (e.g., 4, 6, 8) or an odd number (e.g., 3, 5, 7) of segments 12 for segmented radial seal 10. However, other configurations are possible. For example, in an embodiment, a first segment can have two protruding features 44 (i.e., two male ends), and a second segment can have two recessed features 50 (i.e., two female ends). In this exemplary embodiment, each segment interface 14 would include a protruding feature 44 (i.e., male end) matably attached to a recessed feature 50 (i.e., female end). A segmented radial seal using this exemplary embodiment would most likely have alternating all-male segments and all-female segments, thereby resulting in an even number of segments 12.

Figure 3B:
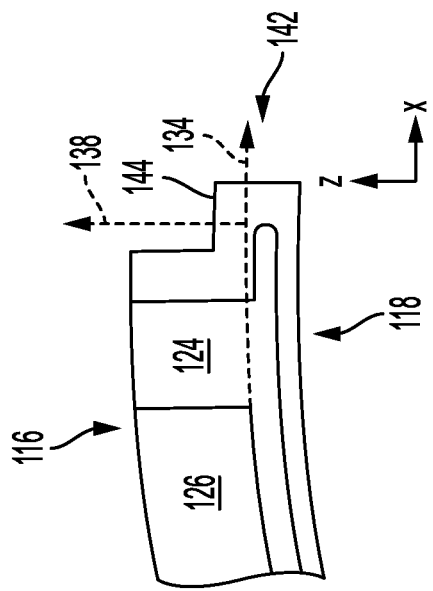
FIG. 3B is a radial side view of the radial seal segment with curved segment interface geometry shown in FIG. 3A.
Figure 3A:
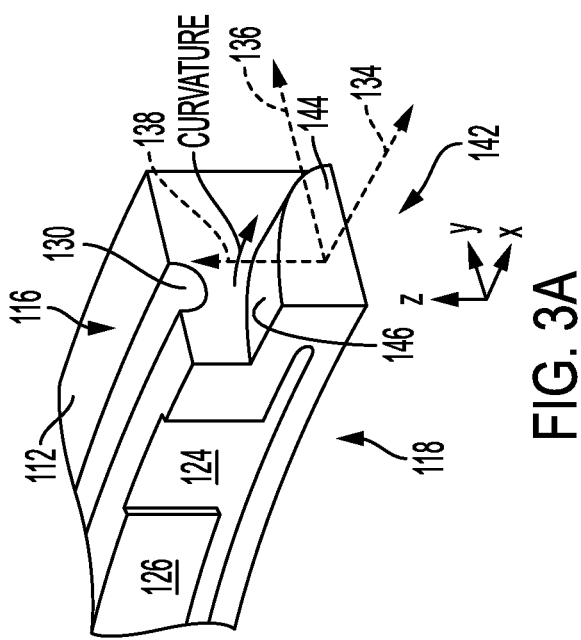
FIG. 3A is a perspective view showing a protruding end of anther embodiment of a radial seal segment with curved segment interface geometry.
Figure 3D:
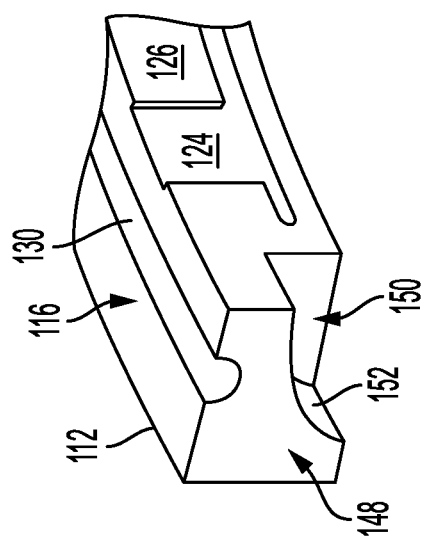
FIG. 3D is a perspective view showing a recessed end of a radial seal segment that accommodates the protruding end shown in FIG. 3A.
Figure 3C:
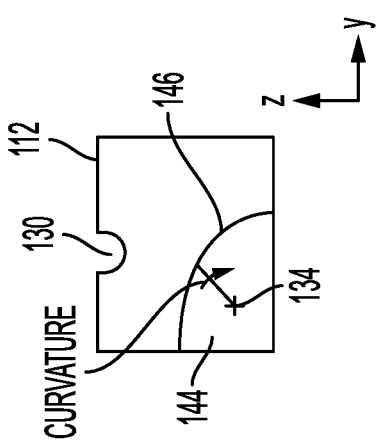
FIG. 3C is an end view of the radial seal segment with curved segment interface geometry shown in FIG. 3A.

FIGS. 3A-3D will be discussed concurrently. FIG. 3A is a perspective view showing a protruding end of anther embodiment of a radial seal segment with curved segment interface geometry. FIG. 3B is a radial side view of the radial seal segment with curved segment interface geometry shown in FIG. 3A. FIG. 3C is an end view of the radial seal segment with curved segment interface geometry shown in FIG. 3A. FIG. 3D is a perspective view showing a recessed end of a radial seal segment that accommodates the protruding end shown in FIG. 3A. Shown in FIGS. 3A-3D are segment 112, outer surface 116, radial contact face 118, axial face recess 124, axial contact surfaces 126, circumferential groove 130, circumferential tangent vector 134, shaft axis 136, radial vector 138, first end 142, protruding feature 144, protruding feature curved surface 146, second end 148, recessed feature 150, and recessed feature curved surface 152. In the illustrated embodiment, first end 142 having protruding feature 144 is similar but opposite of first end 42 having protruding feature 44 that was shown and described above in regard to FIGS. 2A and 2C. The descriptions of segment 112, outer surface 116, radial contact face 118, axial face recess 124, axial contact surfaces 126, circumferential groove 130, circumferential tangent vector 134, shaft axis 136, radial vector 138, first end 142, protruding feature 144, protruding feature curved surface 146, second end 148, recessed feature 150, and recessed feature curved surface 152 are substantially similar to those provided above in regard to FIGS. 2A-2C. First end 142 has protruding feature 144 and can also be referred to as a male end, and second end 148 has recessed feature 150 and can also be referred to as a female end. Circumferential tangent vector 134 defines the axis of curvature of protruding feature curved surface 146, with circumferential tangent vector 134 extending on a plane that is orthogonal (i.e., perpendicular) to shaft axis 136. Therefore, protruding feature 144 can be described as having a first axis of curvature that is parallel to circumferential tangent vector 134 (i.e., the x-axis as depicted in FIG. 3A), which is orthogonal to shaft axis 136 (i.e., the y-axis as depicted in FIG. 3A).

Recessed feature 150 of second end 148 accommodates protruding feature 144 of first end 142 of an adjacent segment 112 when mated together. Recessed feature 150 can also be described as having a first axis of curvature that is parallel to circumferential tangent vector 134, which extends on a plane that is orthogonal to shaft axis 136. Whereas FIG. 3C is an end view of segment 112 showing first end 142 (i.e., the male end), FIG. 3C can also depict an end view of segment 112 showing second end 148 (i.e., the female end) shown in FIG. 3D, because second end 148 is configured to accommodate first end 142 of an adjacent segment 112 when mated together (i.e., matably attached). Protruding feature curved surface 146 of protruding feature 144 has an axis of curvature (i.e., a first axis of curvature) that is parallel to circumferential tangent vector 134. Recessed feature 150 accommodates protruding feature 144, with recessed feature curved surface 152 accommodating protruding feature curved surface 146. In the illustrated embodiment, the shape of protruding feature curved surface 146 as viewed into circumferential tangent vector 134 (i.e., in the y-z plane, as shown in FIG. 3C) represents an arc of an ellipse. In some embodiments, the shape of protruding feature curved surface 146 can represent an arc of an oval or other similar geometric shape. In other embodiments, other configurations are possible, as will be shown.

Figure 4C:
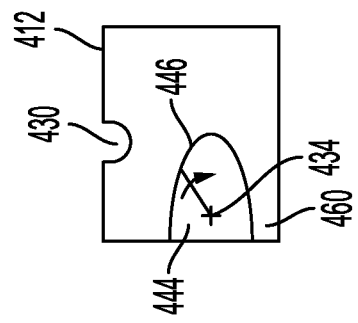
FIG. 4C is an end view of another embodiment of a radial seal segment with curved segment interface geometry.
Figure 4B:
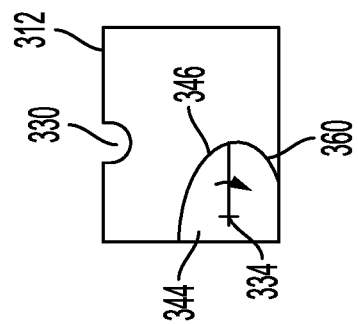
FIG. 4B is an end view of another embodiment of a radial seal segment with curved segment interface geometry.
Figure 4A:
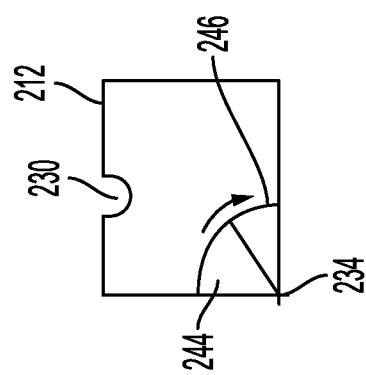
FIG. 4A is an end view of another embodiment of a radial seal segment with curved segment interface geometry.

FIG. 4A is an end view of another embodiment of a radial seal segment with curved segment interface geometry. Shown in FIG. 4A are segment 212, circumferential groove 230, circumferential tangent vector 234, protruding feature 244, and protruding feature curved surface 246. The descriptions of segment 212, circumferential groove 230, and circumferential tangent vector 234 are substantially similar to those provided above in regard to FIGS. 3A-3C. The descriptions of protruding feature 244 and protruding feature curved surface 246 are similar to those provided in regard to FIG. 3C, but protruding feature curved surface 246 is a circular arc (i.e., having a constant radius from circumferential tangent vector 234).

FIG. 4B is an end view of another embodiment of a radial seal segment with curved segment interface geometry. Shown in FIG. 4B are segment 312, circumferential groove 330, circumferential tangent vector 334, protruding feature 344, protruding feature curved surface 346, and inner face 360. The descriptions of segment 312, circumferential groove 330, and circumferential tangent vector 334 are substantially similar to those provided above in regard to FIGS. 3A-3C. The descriptions of protruding feature 344 and protruding feature curved surface 346 are similar to those provided in regard to FIG. 3C, except protruding feature 344 includes inner face 360. Accordingly, the recessed feature of the mating female end (not shown) will have a matching inner point (i.e., ridge) to accommodate inner face 360 of protruding feature 344.

FIG. 4C is an end view of another embodiment of a radial seal segment with curved segment interface geometry. Shown in FIG. 4C are segment 412, circumferential groove 430, circumferential tangent vector 434, protruding feature 444, protruding feature curved surface 446, and inner face 460. The descriptions of segment 412, circumferential groove 430, circumferential tangent vector 434, protruding feature 444, and protruding feature curved surface 446 are substantially similar to those provided above in regard to FIGS. 3A-3D. The description of inner face 460 is similar to that provided above in regard to FIG. 4B, except inner face 460 extends all the way to the axial contact surface (not labeled in FIG. 4C).

Figure 5B:
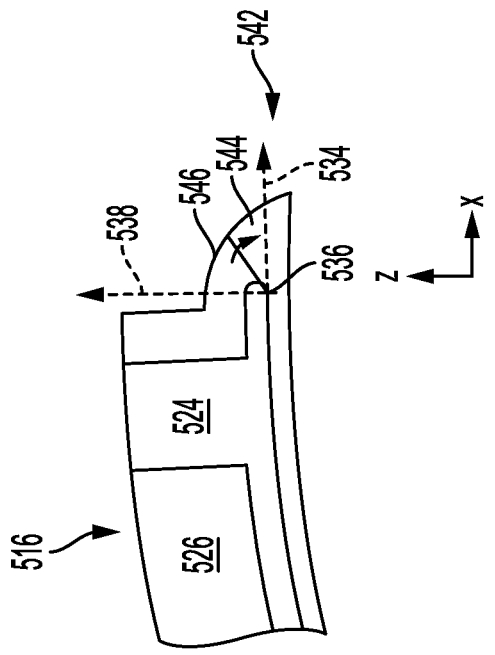
FIG. 5B is a radial side view of the radial seal segment with spherical segment interface geometry shown in FIG. 5A.
Figure 5A:
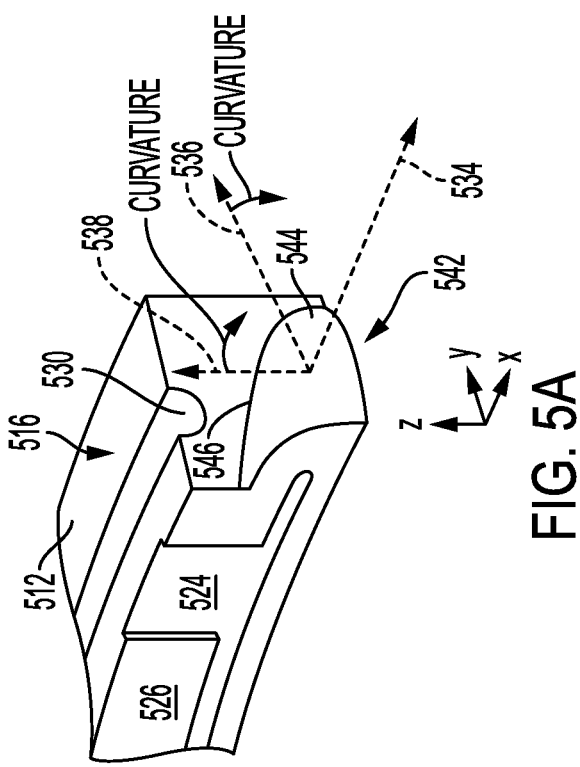
FIG. 5A is a perspective view showing a protruding end of a radial seal segment with spherical segment interface geometry.
Figure 5D:
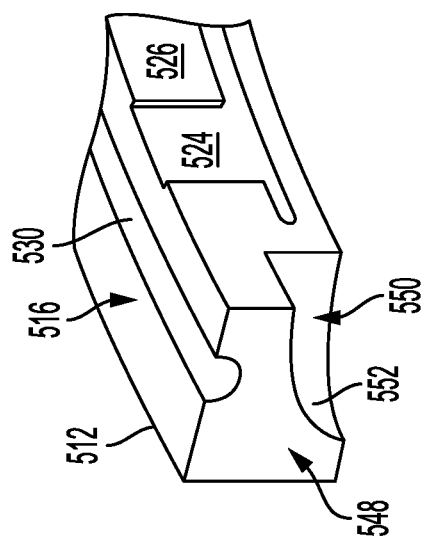
FIG. 5D is a perspective view showing a recessed end of a radial seal segment that accommodates the protruding end shown in FIG. 5A.
Figure 5C:
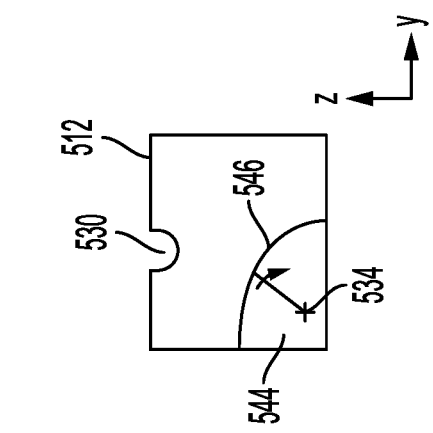
FIG. 5C is an end view of the radial seal segment with spherical segment interface geometry shown in FIG. 5A.

FIGS. 5A-5D will be discussed concurrently. FIG. 5A is a perspective view showing a protruding end of a radial seal segment with spherical segment interface geometry. FIG. 5B is a radial side view of the radial seal segment with spherical segment interface geometry shown in FIG. 5A. FIG. 5C is an end view of the radial seal segment with spherical segment interface geometry shown in FIG. 5A. FIG. 5D is a perspective view showing a recessed end of a radial seal segment that accommodates the protruding end shown in FIG. 5A. Shown in FIGS. 5A-5D are segment 512, outer surface 516, axial face recess 524, axial contact surface 526, circumferential groove 530, circumferential tangent vector 534, shaft axis 536, radial vector 538, first end 542, protruding feature 544, protruding feature curved surface 546, second end 538, recessed feature 550, and recessed feature curved surface 552. The descriptions of segment 512, outer surface 516, axial face recess 524, axial contact surface 526, circumferential groove 530, circumferential tangent vector 534, shaft axis 536, radial vector 538, first end 542, and second end 548 are all substantially similar to those provided above in regard to FIGS. 3A-3D.

First end 542 has protruding feature 544 and can also be referred to as a male end, and second end 548 has recessed feature 550 and can also be referred to as a female end. Protruding feature 544 has curvature along two axes of curvature, as will be described, with protruding feature curved surface 546 resembling a sector of the surface of a three-dimensional ellipsoid. Circumferential tangent vector 534 defines the first axis of curvature of protruding feature curved surface 546, and shaft axis 536 defines the second axis of curvature of protruding feature curved surface 546. Circumferential tangent vector 534 extends on a plane that is orthogonal to shaft axis 536, with circumferential tangent vector 534 and shaft axis 536 each being orthogonal to radial vector 538. Therefore, protruding feature 544 can be described as having a first axis of curvature that is parallel to circumferential tangent vector 534 (i.e., the x-axis as depicted in FIG. 5A), and a second axis of curvature that is parallel to shaft axis 536 (i.e., the y-axis as depicted in FIG. 5A). Recessed feature 550 accommodates protruding feature 544 (i.e., of an adjacent segment 512), with recessed feature curved surface 552 accommodating protruding feature curved surface 546. In some embodiments, the shape of protruding feature curved surface 546 can represent a sector of a three-dimensional ovoid or other similar geometric shape. In other embodiments, other configurations are possible, as will be shown. Protruding feature 544 can be referred to as a radial seal segment with spherical segment interface geometry, whereby "spherical" as an adjective describes a surface profile having at least two axes of curvature. While protruding feature curved surface 546 can be defined as a sector of a sphere (i.e., having a constant radius from a center point), "spherical geometry" is used in the present disclosure to refer to a protruding feature curved surface 546 having at least two axes of curvature, with non-limiting examples including ellipsoids, ovoids, spheres, and the like. For example, in a particular embodiment, protruding feature 544 can resemble a sector of a chicken egg in appearance.

Figure 6C:
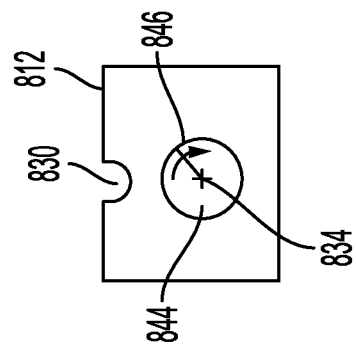
FIG. 6C is an end view of another embodiment of a radial seal segment with spherical segment interface geometry.
Figure 6B:
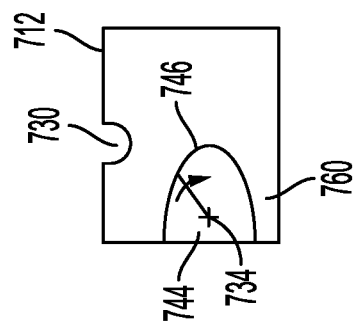
FIG. 6B is an end view of another embodiment of a radial seal segment with spherical segment interface geometry.
Figure 6A:
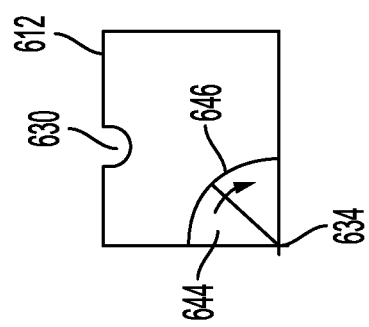
FIG. 6A is an end view of another embodiment of a radial seal segment with spherical segment interface geometry.

FIG. 6A is an end view of another embodiment of a radial seal segment with spherical segment interface geometry. Shown in FIG. 6A are segment 612, circumferential groove 630, circumferential tangent vector 634, protruding feature 644, and protruding feature curved surface 646. Shaft axis (i.e., y-axis) and radial vector (i.e., z-axis) are not shown in FIG. 6A, but are defined in a manner similar to that shown and described in FIG. 5A. The descriptions of segment 612, circumferential groove 630, and circumferential tangent vector 634 are substantially similar to those provided above in regard to FIGS. 3A-3D. The descriptions of protruding feature 644 and protruding feature curved surface 646 are similar to those provided in regard to FIG. 5C, but protruding feature curved surface 646 is a spherical sector (i.e., having a constant radius from a point on circumferential tangent vector 634).

FIG. 6B is an end view of another embodiment of a radial seal segment with spherical segment interface geometry. Shown in FIG. 6B are segment 712, circumferential groove 730, circumferential tangent vector 734, protruding feature 744, protruding feature curved surface 746, and inner face 760. The descriptions of segment 712, circumferential groove 730, circumferential tangent vector 734, protruding feature 744, and protruding feature curved surface 746 are substantially similar to those provided above in regard to FIG. 6A. The description of inner face 760 is similar to that provided above in regard to FIG. 4B, except that inner face 760 has two axes of curvature as described above in FIGS. 5A-5D.

FIG. 6C is an end view of another embodiment of a radial seal segment with spherical segment interface geometry. Shown in FIG. 6C are segment 812, circumferential groove 830, circumferential tangent vector 834, protruding feature 844, and protruding feature curved surface 846, all having descriptions substantially similar to those provided above in regard to FIG. 6A, except that protruding feature 844 is located in a central region of the first end (not labeled in FIG. 6C), meaning that protruding feature is not intersected by either the radial contact face or the axial contact surface (not labeled in FIG. 6C, but substantially similar to those shown and described above in regard to FIG. 1B). Protruding feature 844 can be referred to as having a closed geometry, meaning that protruding feature 844 must be inserted into an associated recessed feature (not shown) in a direction that aligns with circumferential tangent vector 834. As used in the present disclosure, a "closed geometry" can also be referred to as "closed coupling" of a first end 42, 142, 542, etc. of a segment 12, 112, 212, etc. to a second end 48, 148, 548, etc. of an adjacent segment 12, 112, 212, etc.

In the embodiments shown and described in FIGS. 5A-5D and 6A-6C, the second axis of curvature is orthogonal to the first axis of curvature, meaning that the second axis of curvature forms an angle of 90 degrees with the first axis of curvature. In some embodiments, the second axis of curvature can form an angle with the first axis of curvature that is either greater than or less than 90 degrees. In a particular embodiment, the second axis of curvature forms an angle greater than 45 degrees with the first axis of curvature. In yet other embodiments, protruding feature curved surface 546,

646, 746, 846 (i.e., a radial seal segment having spherical segment interface geometry) can be characterized as having three or more axes of curvature. In these other embodiments, one of the axes of curvature can be characterized as being a first axis of curvature that is parallel to circumferential tangent vector 534, 634, 734, 834.

In the embodiment shown above in FIG. 1A, segmented radial seal 10 included four segments 12. In some embodiments, an even number of segments 12 can be used. In other embodiments, an odd number of segments 12 can be used, as described above in regard to FIGS. 2A-2C. In some embodiments, segmented radial seal 10 can include fewer than four segments 12, with two and three segments being within the scope of the present disclosure. In other embodiments, segmented radial seal 10 can include more than four segments 12. In some of these embodiments, segmented radial seal 10 can include twelve or more segments 12.

The exemplary embodiments of the radial seal segment with curved segment interface geometry shown and described above in FIGS. 2A-2C, 3A-3D, and 4A-4C, and of the radial seal segment with spherical segment interface geometry shown and described above in FIGS. 5A-5D and 6A-6C are non-limiting, and other embodiments are all within the scope of the present disclosure. Curved- or spherically-shaped joint geometries of segmented radial seal assemblies provide a better joint seal as compared to square or triangular joint geometries, thereby reducing leakage of fluid (i.e., gas and/or liquid) through the radial seal segment interface from a high-pressure side to a low-pressure side. Accordingly, the various embodiments of the segmented radial seal assembly can accommodate a differential pressure applied from the high-pressure side to the low-pressure side. In various embodiments, the differential pressure can range from about 0-500 psid (about 0-3,450 KPa differential). In some embodiments, the differential pressure applied across a segmented radial seal assembly can be greater than 500 psid (3,450 KPa differential). As shown and described in the various figures, a curved or spherical joint interface geometry is tolerant of misalignment, runout, and other geometric distortions as compared to other designs. A particular advantage of a radial seal segment joint having a first axis of curvature that is parallel to the tangential vector for that associated radial seal segment interface is its ability to accommodate twisting of adjacent segments 12 with respect to each other. A curved or spherical radial seal joint geometry is particularly accommodating of twisting by segments 12 where the twist axis is parallel to a circumferential tangent vector at the joint, such as would occur when shaft 40 is bowed.

A person having skill in the segmented radial seal art will be familiar with methods that can be used to assemble the various segments 12, etc., together to form segmented radial seal 10. Referring to FIG. 1C, for example, it is to be appreciated that various assembly methods can involve placing segments 12 to form segmented radial seal 10, with some methods simply aligning segments 12 in a direction along radial vector 38 (i.e., toward shaft 40). In some embodiments, for example, with protruding feature 444 shown in FIG. 4C, alignment motion along shaft axis 434 may be required because of the design of inner face 460. In other embodiments, for example, with protruding feature 844 shown in FIG. 6C, alignment motion along circumferential tangent vector 834 may be required because of the closed geometry of protruding feature 844 and the associated recessed feature.

In an exemplary embodiment, segments 12 can be made of carbon. Graphite, engineered graphite, and electrographite are non-limiting examples of carbon materials that can be used to make segments 12. In some embodiments, segments 12 can be made of ceramic. Glass, glass-metals, glass-ceramics, and combinations thereof, are non-limiting examples of ceramic materials that can be used to make segments 12. In other embodiments, segments 12 can be made of metallic materials, including metal alloys. Nickel, aluminum, titanium, copper, iron, cobalt, and all alloys that include these various metals, are non-limiting examples of metallic materials that can be used to make segments 12. In various embodiments, segments 12 can accommodate an operating temperature that can range from ambient temperature to about 1,200 deg. F (650 deg. C). In some embodiments, segments 12 can accommodate an operating temperature that is greater than 1,200 deg. F (650 deg. C).

Discussion of Possible Embodiments

The following are non-exclusive descriptions of possible embodiments of the present invention.

A segmented radial seal assembly comprising: a first segment comprising a first segment first end opposite a first segment second end; and a second segment comprising a second segment first end opposite a second segment second end; wherein: the first segment first end comprises a protruding feature; the first segment first end defines a tangential vector from a circumferential ring that is formed by the segmented radial seal; the protruding feature defines a curved face having at least a first axis of curvature, the first axis of curvature being parallel to the tangential vector; the second segment second end includes a recessed feature that is matingly engageable to the first segment first end, thereby forming a first radial seal segment joint; and the segmented radial seal assembly is configured to surround a shaft.

The segmented radial seal assembly of the preceding paragraph can optionally include, additionally and/or alternatively, any one or more of the following features, configurations and/or additional components:

A further embodiment of the foregoing segmented radial seal assembly, wherein the segmented radial seal assembly is a contacting segmented radial seal that is configured to isolate a higher-pressure fluid from a lower-pressure fluid.

A further embodiment of the foregoing segmented radial seal assembly, further comprising: a third segment comprising a third segment first end opposite a third segment second end; and a second radial seal segment joint.

A further embodiment of the foregoing segmented radial seal assembly, comprising a plurality of radial seal segment joints, each configured to reduce leakage of the higher-pressure fluid therethrough.

A further embodiment of the foregoing segmented radial seal assembly, wherein the curved face comprises a cross-sectional shape that is an oval arc. A further embodiment of the foregoing segmented radial seal assembly, wherein the curved face comprises a cross-sectional shape that is a circular arc.

A further embodiment of the foregoing segmented radial seal assembly, wherein: the protruding feature further defines a curved face comprising a second axis of curvature; and the second axis of curvature forms an angle greater than 45 degrees with the first axis of curvature.

A further embodiment of the foregoing segmented radial seal assembly, wherein the protruding feature further defines a curved face having three or more axes of curvature.

A further embodiment of the foregoing segmented radial seal assembly, wherein the protruding feature has a surface contour that is a sector of a spherical surface.

A further embodiment of the foregoing segmented radial seal assembly, wherein the protruding feature has a surface contour that is a sector of an ovoid surface.

A further embodiment of the foregoing segmented radial seal assembly, wherein the radial seal joint is configured to accommodate movement of the first segment first end relative to the second segment second end.

A further embodiment of the foregoing segmented radial seal assembly, wherein: the movement is a twisting movement defining a twist axis; and the twist axis is parallel to the first axis of curvature.

A further embodiment of the foregoing segmented radial seal assembly, wherein the radial seal segment joint is configured to reduce a leakage of a fluid from a high pressure side to a low pressure side.

A further embodiment of the foregoing segmented radial seal assembly, wherein each of the two or more segments comprises carbon, graphite, engineered graphite, and/or electrographite.

A further embodiment of the foregoing segmented radial seal assembly, wherein each of the two or more segments comprise nickel, aluminum, titanium, copper, iron, cobalt, and/or alloys thereof.

A further embodiment of the foregoing segmented radial seal assembly, wherein each of the two or more segments comprise glass, glass-metals, glass-ceramics, ceramics, and/or combinations thereof.

A segmented radial seal comprising two or more radial seal segments, each radial seal segment comprising a first end and a second end, wherein: the first end comprises a protruding feature; the first end defines a tangential vector from a circumferential ring that is formed by the segmented radial seal; the protruding feature defines a curved face having at least a first axis of curvature, the first axis of curvature being parallel to the tangential vector; and the second end comprises a recessed feature that is matingly engageable to the first end.

The segmented radial seal of the preceding paragraph can optionally include, additionally and/or alternatively, any one or more of the following features, configurations and/or additional components:

A further embodiment of the foregoing segmented radial seal, comprising at least a first radial seal segment and a second radial seal segment, wherein: the first radial seal segment comprises a first radial seal segment first end opposite a first radial seal segment second end; the second radial seal segment comprises a second radial seal segment first end opposite a second radial seal segment second end; the first radial seal segment first end and the second radial seal segment second end form a radial seal segment joint; and the radial seal segment joint is configured to accommodate movement of the first segment first end relative to the second segment second end.

A further embodiment of the foregoing segmented radial seal, wherein: the movement is a twisting movement defining a twist axis; and the twist axis is parallel to the first axis of curvature.

A further embodiment of the foregoing segmented radial seal, wherein the radial seal segment joint reduces a leakage of a fluid from a high pressure side to a low pressure side.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A segmented radial seal assembly that is annular and comprising:
   a central axis, wherein the segmented radial seal assembly extends circumferentially about the central axis;
   a first segment comprising:
      a first segment first end opposite a first segment second end;
      a first segment outer surface opposite a first segment radial contact face; and
      a first segment axial contact surface extending between the first segment outer surface and the first segment radial contact face;
   a second segment comprising a second segment first end opposite a second segment second end and a second segment outer surface opposite a second segment radial contact face;
   wherein:
      the first segment first end defines a tangential vector from a circumferential ring that is formed by the segmented radial seal;
      the first segment first end comprises a protruding feature, wherein the protruding feature comprises:
         a curved face comprising:
            a first axis of curvature, the first axis of curvature being parallel to the tangential vector;
            a second axis of curvature, wherein the second axis of curvature forms an angle greater than 45 degrees with the first axis of curvature;
            an arc of an ellipse extending from the first segment axial contact surface to the first segment radial contact face; and
         a radial thickness relative the central axis, wherein the radial thickness decreases along the tangential vector toward the second segment second end, and wherein the radial thickness decreases along the central axis away from the first segment axial contact surface;
      the second segment second end includes a recessed feature that is matingly engageable to the first segment first end, thereby forming a first radial seal segment joint; and
      the segmented radial seal assembly is configured to surround a shaft.

2. The segmented radial seal assembly of claim 1, wherein the segmented radial seal assembly is a contacting segmented radial seal that is configured to isolate a higher-pressure fluid from a lower-pressure fluid.

3. The segmented radial seal assembly of claim 2, further comprising:
   a third segment comprising a third segment first end opposite a third segment second end; and
   a second radial seal segment joint.

4. The segmented radial seal assembly of claim 3, wherein each of the radial seal segment joints are configured to reduce leakage of the higher-pressure fluid therethrough.

5. The segmented radial seal assembly of claim 1, wherein the radial seal joint is configured to accommodate movement of the first segment first end relative to the second segment second end.

6. The segmented radial seal assembly of claim 5, wherein:

the movement is a twisting movement defining a twist axis; and the twist axis is parallel to the first axis of curvature.

7. The segmented radial seal assembly of claim 1, wherein the radial seal segment joint is configured to reduce a leakage of a fluid from a high pressure side to a low pressure side.

8. The segmented radial seal assembly of claim 1, wherein each of the two or more segments comprises carbon, graphite, engineered graphite, and/or electrographite.

9. The segmented radial seal assembly of claim 1, wherein each of the two or more segments comprise nickel, aluminum, titanium, copper, iron, cobalt, and/or alloys thereof.

10. The segmented radial seal assembly of claim 1, wherein each of the two or more segments comprise glass, glass-metals, glass-ceramics, ceramics, and/or combinations thereof.

11. A segmented radial seal that is annular about a central axis and comprising two or more radial seal segments, wherein each radial seal segment of the two or more radial seal segments comprises:
   a segment outer surface;
   a segment radial contact face radially within the segment outer surface;
   a segment axial contact surface extending radially between the segment outer surface and the segment radial contact face; and
   a first end opposite a second end, wherein the first end comprises a protruding feature extending in a circumferential direction relative to the central axis of the segmented radial seal, wherein the protruding feature comprises:
   a curved face comprising:
      a first axis of curvature parallel to the circumferential direction;
      a second axis of curvature that forms an angle greater than 45 degrees with the first axis of curvature; and
      an arc of an ellipse extending from the segment axial contact surface to the segment radial contact face; and
   a radial thickness relative the central axis, wherein the radial thickness decreases along the circumferential direction, and wherein the radial thickness decreases along the central axis away from the segment axial contact surface; and
   the second end comprises a recessed feature with a recessed feature curved surface matingly matching the curved face of the protruding feature.

12. The segmented radial seal of claim 11, wherein the two or more radial seal segments further comprises:
   a first radial seal segment comprises a first radial seal segment first end opposite a first radial seal segment second end;
   a second radial seal segment comprises a second radial seal segment first end opposite a second radial seal segment second end;
   the first radial seal segment first end and the second radial seal segment second end form a radial seal segment joint; and
   the radial seal segment joint is configured to accommodate movement of the first segment first end relative to the second segment second end.

13. The segmented radial seal of claim 12, wherein:
   the movement is a twisting movement defining a twist axis; and
   the twist axis is parallel to the first axis of curvature.

14. The segmented radial seal of claim 13, wherein the radial seal segment joint reduces a leakage of a fluid from a high pressure side to a low pressure side.

* * * * *